United States Patent
Somasundaram et al.

(10) Patent No.: US 12,223,295 B2
(45) Date of Patent: Feb. 11, 2025

(54) AUGMENTED REALITY POWERED AUTO CODE GENERATOR

(71) Applicant: Bank of America Corporation, Charlotte, NC (US)

(72) Inventors: Arunkumar Somasundaram, Coimbatore (IN); Udhayan M, Madurai (IN); Lalitha Rajeswari Karanam, Hyderabad (IN); Balamurali Lakshminarayanan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 125 days.

(21) Appl. No.: 18/138,779

(22) Filed: Apr. 25, 2023

(65) Prior Publication Data
US 2024/0361995 A1 Oct. 31, 2024

(51) Int. Cl.
*G06F 8/30* (2018.01)
*G06F 8/36* (2018.01)
*G06F 8/71* (2018.01)
*G06T 19/00* (2011.01)

(52) U.S. Cl.
CPC .............. *G06F 8/36* (2013.01); *G06F 8/71* (2013.01); *G06T 19/006* (2013.01)

(58) Field of Classification Search
CPC ..... G06F 8/36; G06F 8/71; G06F 8/30; G06T 19/006
See application file for complete search history.

(56) References Cited

U.S. PATENT DOCUMENTS

| 6,876,314 B1* | 4/2005 | Lin ........................... G06F 8/30 341/50 |
| 10,235,142 B1 | 3/2019 | Chaffin |
| 2016/0026853 A1* | 1/2016 | Wexler ................... H04N 23/50 382/103 |
| 2018/0150810 A1* | 5/2018 | Lee ........................ G06F 21/606 |

* cited by examiner

*Primary Examiner* — Anibal Rivera
(74) *Attorney, Agent, or Firm* — Weiss & Arons LLP

(57) ABSTRACT

A method for deploying executable programming code, in real-time, leveraging an augmented reality ("AR") device may be provided. The AR device may be a part of a network of AR devices. Each AR device within the network may be in electronic communication with each other during a duration of time that data displayed is captured, converted, analyzed, code generated and further visualized as a preview in an AR display through the AR device. The method may include capturing, continuously, images of data displayed on a display screen. The method may further include analyzing each captured image in order to identify a captured image comprising a plurality of text associated with computer processing steps for processing a set of documents. In response to the identifying, converting the captured image into a text file and searching to find an optimal function for each step in the set of computer processing steps.

20 Claims, 6 Drawing Sheets

AUGMENTED REALITY POWERED AUTO CODE GENERATOR

FIELD OF TECHNOLOGY

Aspects of the disclosure relate to auto-code generation leveraging augmented reality.

BACKGROUND OF THE DISCLOSURE

When a group of individuals associated with an entity meet to solve entity-related issues, there are ideas, steps and methods discussed and displayed in order to come up with a set of steps to resolve the issues. The issues may be associated with the handling and managing of documents, both small sets of documents and large sets of documents.

When the set of steps are identified, code needs to be built to perform the set of steps. This can typically take some time to build and then additional time for each individual to review the code and either approve or deny the code.

Therefore, it would be desirable to enable building code, in real-time and further enable each individual to visualize the results of the execution of the code in real-time.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
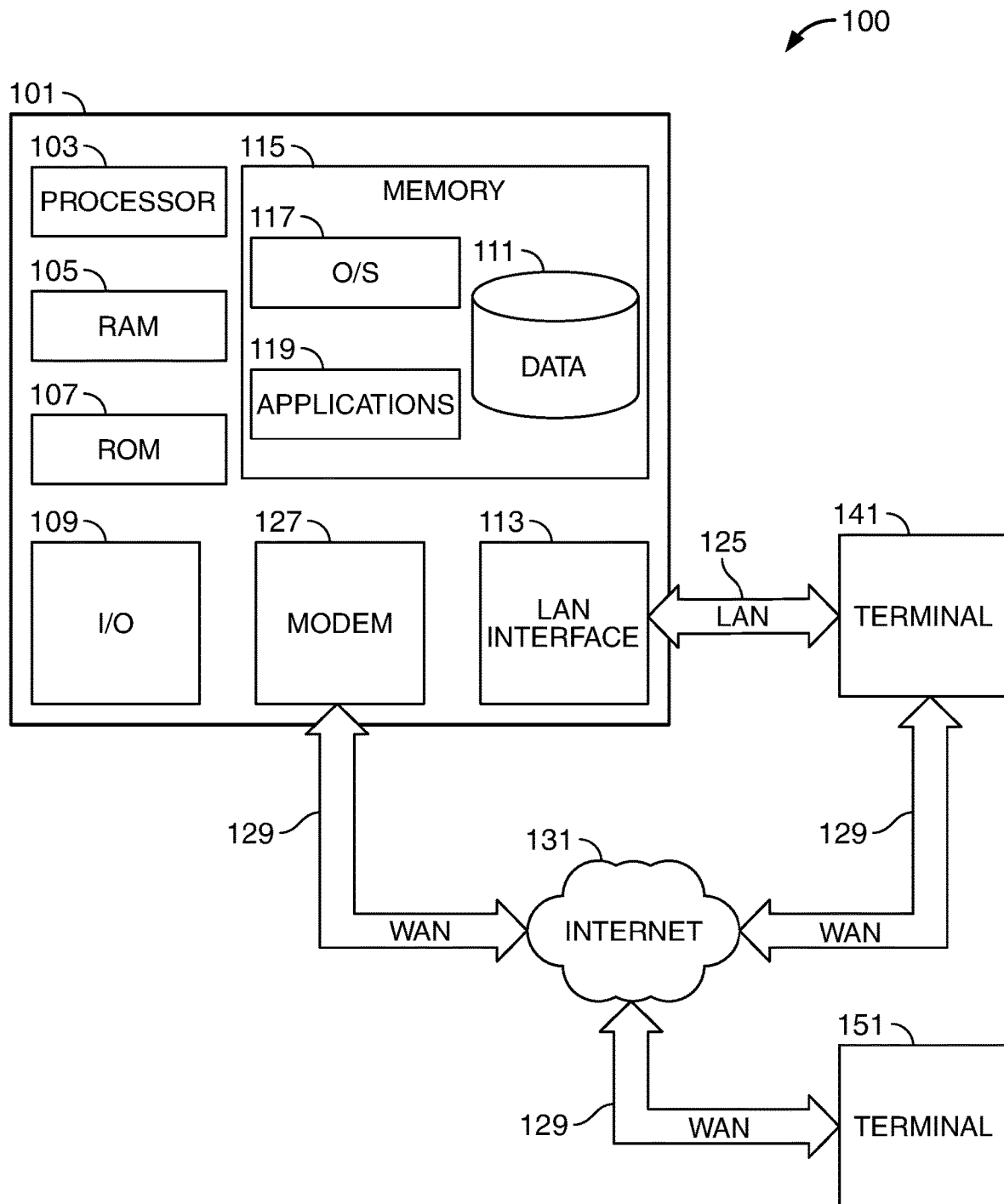
FIG. 1 shows an illustrative block diagram in accordance with principles of the disclosure.

An augmented reality ("AR") device for generating and executing executable programming code, in real-time, is provided. The AR device may be a part of a network of AR devices.

The AR device may be a mobile camera with microprocessing capabilities. The AR device may be a smart glasses device powered with AR capabilities.

Each AR device from the network of AR devices may be a wearable device on a user. Each user may be viewing the display screen.

The display screen may be a smartboard. The display screen may be a monitor. The display screen may be a whiteboard. The display screen may include network connection capabilities and may be connected to a computing device. The computing device may be in electronic communication with the computing device and users viewing the display screen may be enabled to input data on the display screen via the computing device. Data displayed on the display screen may continuously change based on the users viewing the display and the items being discussed.

When the display screen is a whiteboard or any other similar device without network connection, the data displayed may be a physical document and/or handwritten text.

The AR device may include a sensor. The sensor may be a camera. The camera may be operable to continuously scan a display screen. The camera may be operable, while scanning, to capture images of data displayed within pre-determined boundaries of the display screen. Pre-determined boundaries may be determined by detection of a trimming and/or border defining the edges of a screen or monitor. Pre-determined boundaries may be defined by a maximum width and height. Pre-determined boundaries may be defined by what is within visual view of the AR device.

The images may be captured continuously. The images may be captured at pre-determined intervals.

The AR device may also include a microprocessor. The microprocessor may be operable to execute one or more software applications running on the AR device for capturing images, recognizing text on the captured images, deciphering computer processing steps based on the recognized text and generating the executable programming code for performing the computer processing steps.

The AR device may leverage artificial intelligence ("AI") for recognizing text that is associated with computer processing steps.

The microprocessor may be operable to receive each captured image from the camera and store each captured image at the AR device.

The microprocessor may be operable to analyze each captured image in order to identify a captured image that may include a plurality of text associated with computer processing steps. The computer processing steps may be steps designed in order to process a set of documents.

The identifying of the text may be enabled using character and text recognition software capabilities. The microprocessor may leverage OpenCV® for identifying the text. OpenCV may be an open source computer vision and machine learning software library. Any image, video and/or text that may be included in the image may be recognized and further transmitted to an AI processor.

In response to an identification of the captured image, the AR device may be configured to transmit an electronic communication to the network of AR devices for retrieval of a most-repeated image captured by each of the remaining AR devices within the network of AR devices.

It should be appreciated that the remaining AR devices within the network of AR devices may also be continuously capturing images of data displayed on the display screen and further storing the images at each of the remaining AR devices.

Simultaneous to a transmittal of the electronic communication, the AR device may be configured to identify a most-repeated image stored at the AR device by retrieving each captured image stored at the AR device that has been historically received within a pre-determined time period prior to a receipt of the captured image. The identifying may further include analyzing each captured image received prior to the captured image for a most-repeated image.

The pre-determined time period may be a few seconds, 5 minutes, 10 minutes, 30 minutes, a duration of time that the users of the AR devices are in a meeting or any other suitable time period.

In response to the analyzing, the most-repeated image may be identified. The most-repeated image may include the set of documents for processing.

When both the AR device and the remaining AR devices retrieve the most-repeated image, the microprocessor may be operable to compare the most-repeated image from the AR device to the most-repeated image retrieved from each of the remaining AR devices.

In some embodiments, when the most-repeated image from the AR device is not included in any one of the most-repeated images from each of the remaining AR devices, the AR device may be configured to prompt the user of the AR device to select the image that includes the computer processing steps by displaying on the AR display a plurality of captured images captured during the duration of time of the meeting.

When at least one of a most repeated images retrieved includes the set of documents, the microprocessor may be configured to determine a classifier for the set of documents. The classifier may define the type of document.

For example, when the set of documents is a plurality of mortgage documents, by defining the classifier as a mortgage type document, the generating of the code may be generated to be unique to mortgage type documents or another suitable type of document.

The AR device may include an AI image processing neural network application that may be configured to convert the captured image into a text file.

The AR device may include an AI analyzer application. The AI analyzer may be an application that may be configured to identify, within the text file, a set of computer processing steps.

The AR device may also include an AI code generator application. The AI code generator application may be an application that may be configured to generate code to perform the computer processing steps.

The AI code generator may be configured to search a production repository for a pre-generated function that performs the set of computer processing steps based on the classifier.

When the pre-generated function in the production repository is identified, the AI code generator may be configured to transmit the pre-generated function to an AI code builder for compiling.

When the pre-generated function in the production repository is not identified, the microprocessor may be configured to search a plurality of code containers to find an optimal function for each step in the set of computer processing steps.

It should be appreciated that the code containers may include, but may not be limited to, a Java® container, a .Net® container, a Python container and the production repository. The code containers may be stored in a cloud server.

In response to a selection of the optimal function for each step, the AI code generator may be configured to transmit the optimal function for each step to the AI code builder application for compiling.

The AI code builder application may be configured to, upon receipt of the pre-generated function, receive the pre-generated function and compile the pre-generated function into a single executable programming code. The AI code builder may be further configured to transmit the single executable programming code to an AI code tester application.

The AI code builder application may be configured to, upon receipt of the optimal function, compile the optimal function for each step into a single executable programming code and transmit the single executable programming code to an AI based test builder.

The AI based test builder may be configured to test the single executable programming code and output test results.

The microprocessor may be configured to transmit the test results to an internet of things ("IoT") device to convert the test results into an AR readable format for being displayed on an AR display.

The IoT device may be configured to convert the test results and the single executable programming code into a format that the AR device may be enabled to view.

The AR display may be configured to display the converted test results.

The microprocessor may be configured to, in response to a trigger of an approval of the converted test results, feed the single executable programming code to a central server for deployment.

The trigger of the approval may be a gesture from each user. The gesture may include body movements of the user of the smart device. Exemplary body movements may include the waving of a hand, movement of a foot, movement of an arm, positioning one or two hands into a predefined shape, or any other suitable body movement.

In response to a trigger of a rejection of the converted test results, the microprocessor may be configured to transmit a request to the AI code builder to re-generate the code using an alternative snippet of code from the same code container or from a different code container.

Following the approval of the test results, the microprocessor may be further configured to store the single executable programming code in the production repository.

It should be appreciated that the converted test results may be in a form of a video and/or images.

The video displayed in an AR display may be a preview of a performance of the computer processing steps.

Users of the AR device may visualize, in the AR display, the results of the execution of the code for processing the set of documents.

The testing of the single executable programming code may also include executing the code against a plurality of test scenarios, performance testing and load testing. Upon completion, it may be previewed on the AR display via the IoT.

It should be appreciated that following the feeding of the single executable programming code to the central server for deployment, the single executable programming code may be available in real-time for processing the set of documents.

In some embodiments the AR device may be a primary AR device and each of the remaining AR devices may be a secondary AR device. When the AR device is the primary device, each of the secondary AR devices may be used for confirming accuracy of algorithms and output performed at the primary AR device.

In some embodiments, each AR device within the network of AR devices may be the primary AR device. Each AR device may perform all steps and each AR device may be in electronic communication with each other for comparing and outputting a most accurate result.

A method for generating and deploying executable programming code, in real-time is provided. The method may leverage an AR device. The method may be performed by the AR device.

The method may include, capturing, continuously, images of data displayed within pre-determined boundaries of a display. The display may be a display screen. The display screen may be a smartboard. The display screen may be a whiteboard. The display screen may be a single document, i.e.—a piece of paper with handwritten and/or typed text.

The method may include storing each captured image at the AR device.

The method may further include analyzing each captured image in order to identify a captured image comprising a plurality of text being associated with computer processing steps for processing a set of documents. The analyzing may be performed using character and text recognition algorithms.

In response to an identification of the captured image, identifying a most-repeated image from the AR device. The identifying of the most-repeat image may include retrieving each captured image stored at the AR device that has been historically received within a pre-determined time period prior to a receipt of the captured image. Following the retrieving, the method may include analyzing each captured image received prior to the captured image for a most-repeated image.

In response to the analyzing, the method may include identifying the most-repeated image, wherein the most-repeated image may include the set of documents for processing.

The method may further include comparing the most-repeated image from the AR device to the most-repeated image retrieved from each of the remaining AR devices.

When at least one of a most repeated images retrieved includes the set of documents, the method may include determining a classifier for the set of documents. The classifier may define a type of document. By defining the type of document, the searching for the most optimal functions and codes for executing the processing of the set of documents may be more accurate.

The method may further include converting the captured image into a text file. Following the converting, the method may include identifying within the text file, a set of computer processing steps.

The method may further include searching a plurality of code containers to find an optimal function for each step in the set of computer processing steps.

In response to a selection of the optimal function for each step, the method may include compiling the optimal function for each step into a single executable programming code.

The method may further include testing the single executable programming code against one or more test scenarios.

Following the testing, the method may include outputting test results.

The method may further include transmitting the test results and the single executable programming code to an IoT device for being operable for displaying on an AR display.

The method may further include previewing, on the AR display, the test results and the single executable programming code executed against a plurality of test scenarios. The user of the AR device may be enabled to visualize the execution of the code and either approve or deny the code for deployment.

The method may further include receiving approval via a user of the AR device of the previewing. In response to receiving approval, the method may include transmitting the single executable programming code to a central server for deploying.

The method may also include, in response to a receipt of a denial, transmitting the text file and the single executable programming code to an AI code builder application within the AR device for re-selecting a most optimal function.

It should be appreciated that the previewing may be a preview in a form of a video type file and/or image file.

The method may further include in response to a receipt of approval, storing the single executable programming code in a production repository as a pre-generated executable programming code for re-use.

Following the transmitting of the single executable programming code to the central server for deploying, the method may include executing the single executable programming code in real-time for processing the set of documents.

A method for generating and deploying executable programming code, in real-time, leveraging an AR device, may be provided. The method may be performed by the AR device. The AR device may be a part of a network of AR devices. The method may include detecting a trigger by a user of the AR device for capturing data.

In response to the trigger, the method may include capturing an image of data that is within visual view of the AR device.

The method may further include storing the captured image at the AR device.

The method may also include converting the captured image into a text file. Following the converting, the method may include identifying a set of computer processing steps included within the text file. The identifying may be performed by one or more text and character recognition applications.

The method may further include confirming the set of computer processing steps for accuracy by transmitting the text file to a second AR device within the network of AR devices. The transmitting may enable identifying, via the second AR device, a second set of computer processing steps included within the second text file. Following the identifying, the method may include receiving from the second AR device, the second set of computer processing steps identified within the second text file.

The method may further include comparing the first set of computer processing steps to the second set of computer processing steps. In response to the comparing, the method may include confirming an accuracy of the set of computer processing steps.

When in response to the comparing the accuracy is not confirmed, the method may include re-capturing an image of the data that is within visual view of the AR device. The AR device may not have been focusing at the display from a most accurate angle and therefore by capturing the image for a second time, a more clear image may be captured and the converting of the image to a text file may be more accurate.

Following the identifying and confirming of the set of computer processing steps, the method may include searching a plurality of code containers to find an optimal function for each step in the set of computer processing steps.

In response to a selection of the optimal function for each step, the method may include compiling the optimal function for each step into a single executable programming code.

The method may further include testing the single executable programming code and outputting test results.

The method may further include transmitting the test results and the single executable programming code to an IoT device for being operable for displaying on an AR display.

It should be appreciated that the AR device may be a smart glasses that includes AR capabilities.

By using AR to visualize the deploying of the single executable programming code for processing the set of documents, this enables a real-time approval or denial of the code by users and developers and a quicker process for deploying the code upon approval.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as each AR device within the network of AR devices, the production server and the IoT device. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101. Terminals 141 and 151 may include the display, the IoT device and the production server.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within each AR device and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include the AI analyzer, AI image processing neural networks, AI code generator, AI code builder, AI code tester, rejection analyzer module, code deployment tool and any other application described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 2:
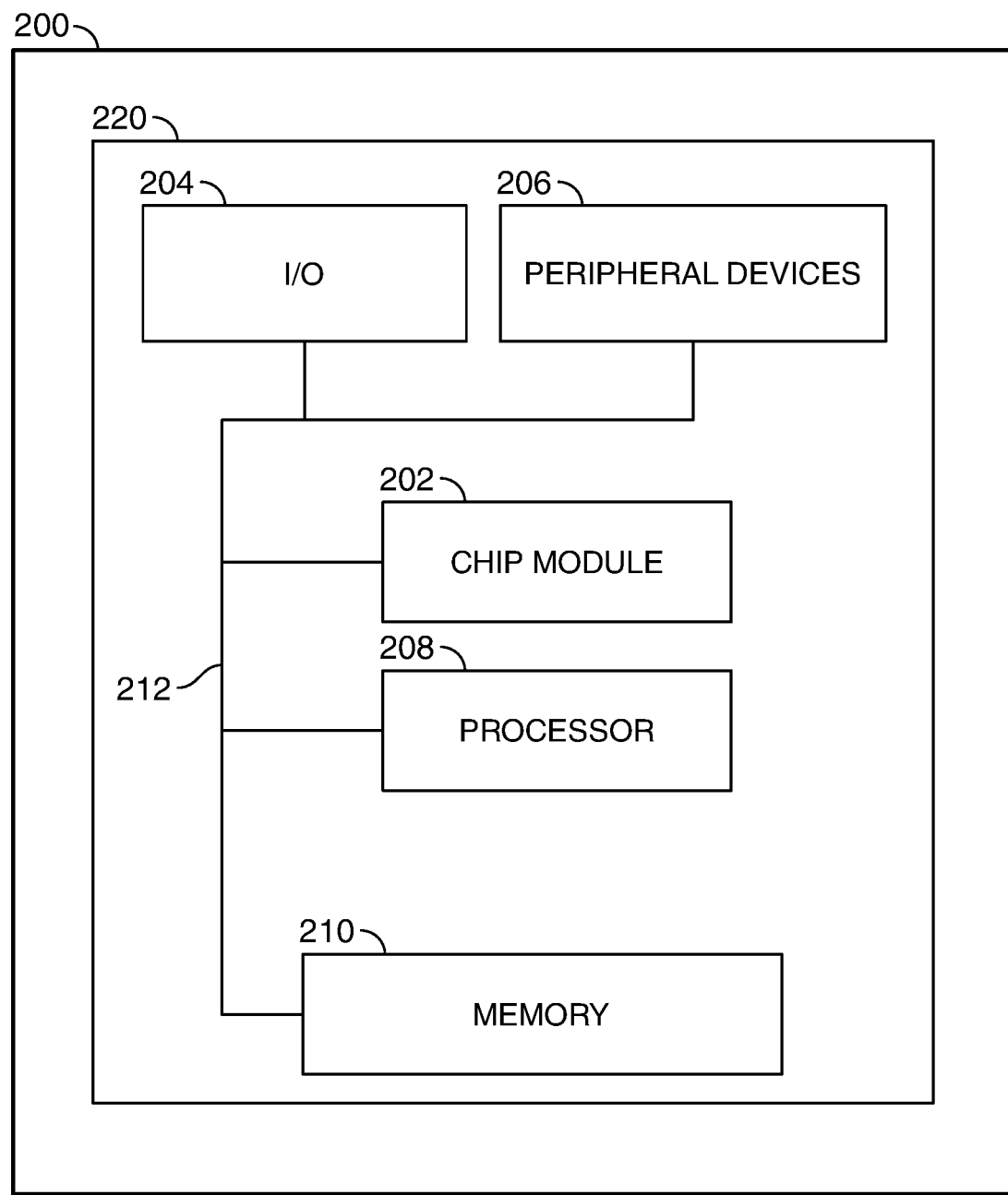
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
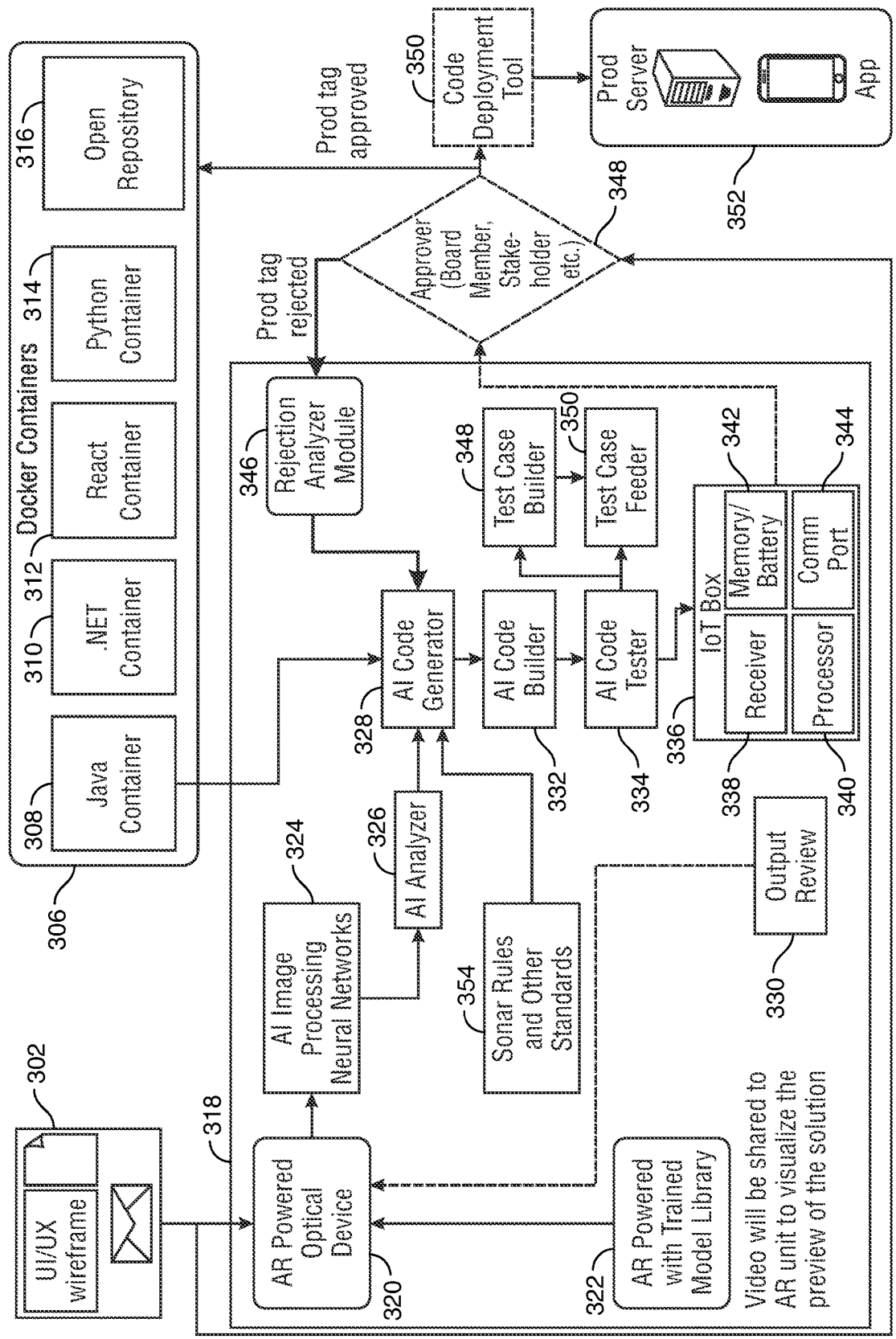
FIG. 3 shows an illustrative architecture diagram in accordance with principles of the disclosure.

FIG. 3 shows an illustrative diagram of steps performed to auto-generate executable programming code in real-time for solving a requirement associated with an entity that needs to be executed. The requirement may involve a set of computer processing steps determined by one or more users/developers to process a set of documents.

An AR powered optical device 320 may be configured to capture data 302 that may be displayed. The data may be displayed as hand-written text on a white-board. The data may be displayed on a physical document. The data may be displayed in an email projected on a screen. The data may be displayed as a UI/UX wireframe.

The data may be associated with a potential solution for processing documents associated with an entity. The potential solutions may be displayed as a set of processing steps on the white-board, word document, physical document, email or any other suitable format.

The AR powered optical device 320 may be a mobile camera, screen reader, smart glasses or any other similar device configured with AR capabilities.

AR powered optical device 320 may include a trained model library 322. Trained model library 322 may enable capturing the appropriate data including images and/or videos, recognition of the data and transmitting the data to the AI processor 324. AI processor 324 may use AI image processing neural networks 324 for converting the data into a text file.

The text file may then be transmitted to an AI analyzer 326 to decipher the set of processing steps included in the text file for processing the set of documents.

The set of processing steps may be transmitted to an AI code generator 328. AI code generator 328 may be configured to generate code for each step in the set of processing steps. AI code generator 328 may search the open repository 316 for pre-generated code that performs the step. When pre-generated code does not match the step, AI code generator 328 may search through docker containers 306 for a most accurate match of a snippet of code for the step. Docker containers 306 may include java container 308, .Net container 310, React container 312, Python container 314, and open repository 316.

AI code generator may leverage sonar rules and other standards, as shown at 354, for generated the code for each step in the set of processing steps.

The pre-generated code or the most accurate snippet of code for each step may be transmitted to AI code builder 332 for compiling into a single executable programming code.

AI code builder 332 may transmit the single executable programming code to AI code tester 334 for testing. AI code tester 334 may include a test case builder 348 and a test case feeder 350. The single executable programming code may be tested against test cases stored in the open repository 316 for a level of success of the code.

It should be appreciated that each of the AI modules including AI image processing neural networks 324, AI analyzer 326, AI code generator 328, AI code builder 332, AI code tester 334 and rejection analyzer module 346 may be embedded in the AR powered optical device 318. These AI modules may be software applications running at the AR powered optical device 318.

Following testing, the results of the testing may be transmitted to IoT device 336. IoT device 336 may include a receiver 338, a processor 340, a memory, a battery 342 and a communication port 344.

Receiver 338 may be configured to receive the test results from the AI code tester 334 and convert the results into an AR based format for viewing within the AR smart devices. IoT device 336 may output the converted results for review, as shown at 330 via AR powered optical device 320.

The final output of the business requirement may be viewed by the users of the AR devices for approval 348.

Upon approval, the single generated executable programming code may be transmitted to open repository 316 for storing. Additionally, the single generated executable programming code may be transmitted to a code deployment tool 350 for real-time deploying at production server 352.

Upon deployment, the single generated executable programming code may be available for use.

When any one or more users disapprove of the results, the code and the results may be transmitted to rejection analyzer module 346 to re-assess and generate a new set of code.

Figure 4A:
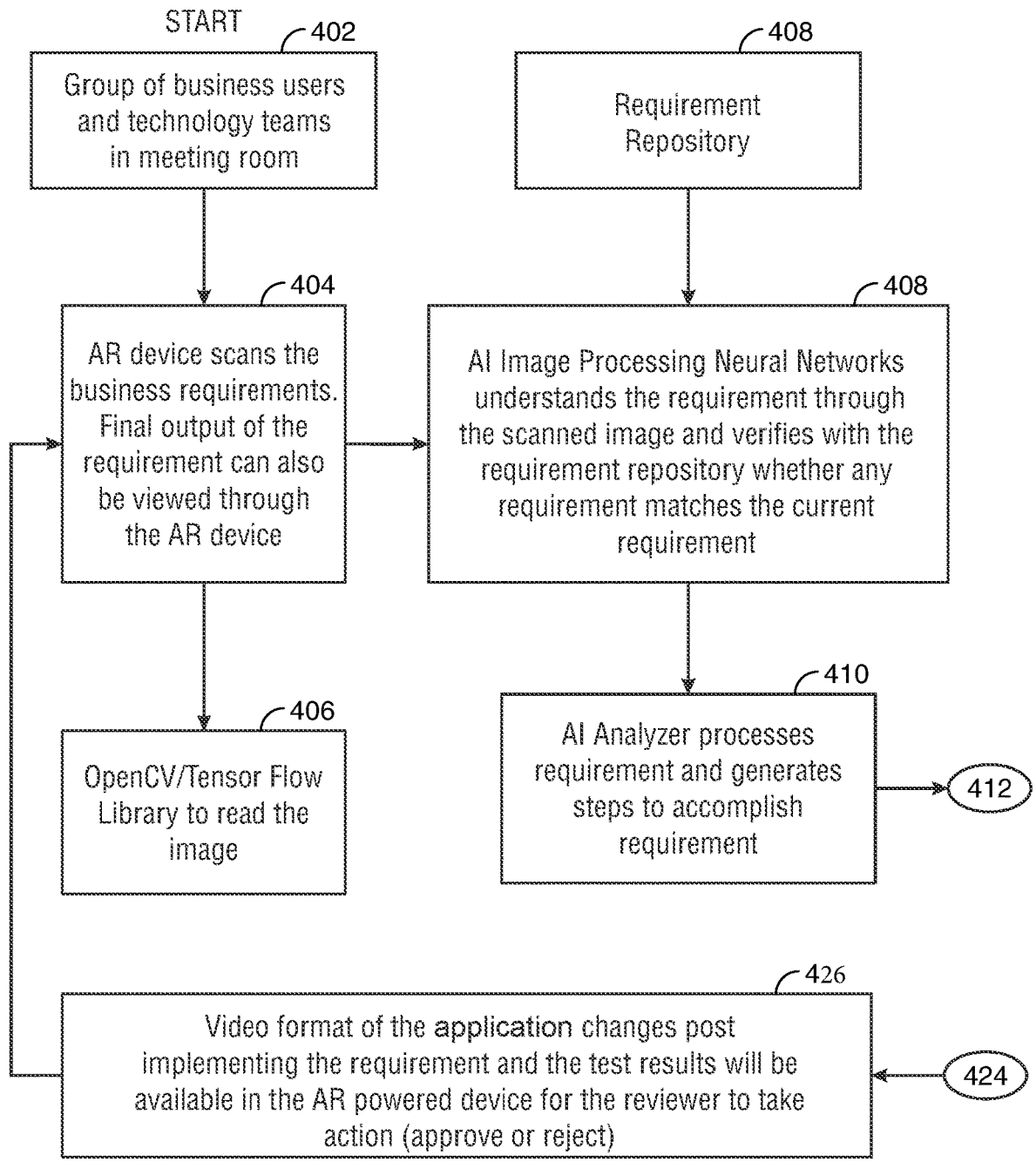
FIG. 4A shows an illustrative flow diagram in accordance with principles of the disclosure.
Figure 4B:
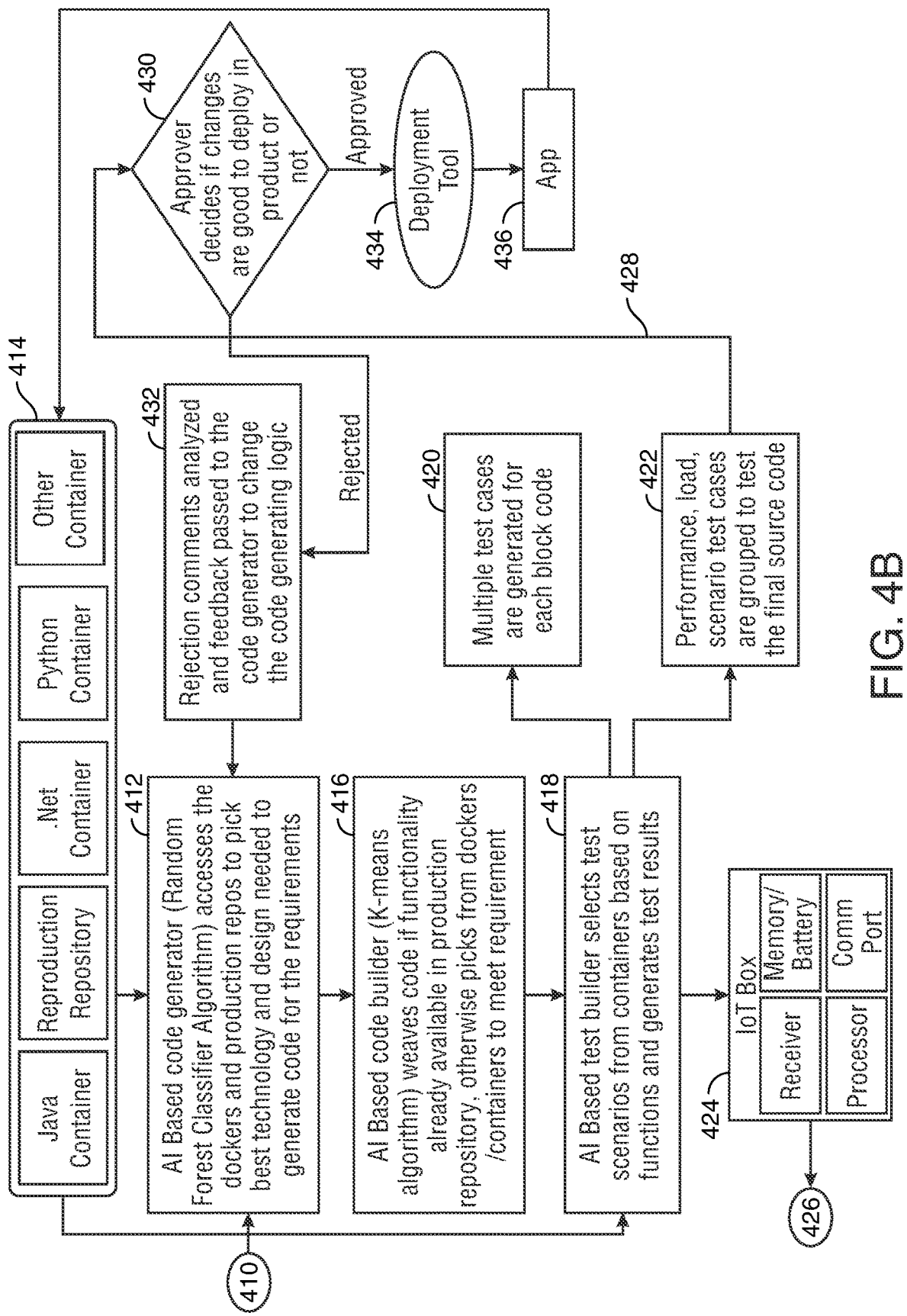
FIG. 4B shows an illustrative flow diagram in accordance with principles of the disclosure.

FIG. 4A and FIG. 4B show an illustrative flow diagram for steps performed to auto-generate executable programming code in real-time for solving the requirement.

At 402, a group of business users and technology teams may meet in a meeting room for producing steps to solve, in real-time, a business requirement.

At 404, an AR device may scan the business requirement that may be displayed to the users. The business requirement may include steps for solving a requirement. The steps may be displayed on a screen, white-board, document or any other similar format.

It should be appreciated that one AR device may scan the requirements. In some embodiments, a plurality of AR devices may each scan the business requirement. Each of the plurality of AR devices may be in electronic communication with each other.

AR device may include trained model libraries for capturing data. The libraries may include OpenCV and/or Tensor Flow Library to read the image beings scanned, as shown at 406.

Following a scanning of the image, AI image processing neural networks, at 408, may understand the requirement through the scanned image. AI image processing neural networks may verify with the requirement repository whether any requirement matches the current requirement.

At 410, AI analyzer may process the requirement and generate steps in order to accomplish the requirement.

At 412, an AI based code generator may access the docker containers at 414 and the production repository 316 to select the best technology and design needed to generate code for the requirements. AI based code generator 412 may use random forest classifier algorithms to enable a most accurate selection.

At 416, an AI based code builder may weave the selected code when the functionality is already available in the production repository. AI based code builder, when functionality is not available, may select from the docker containers 414, snippets of code that may meet the requirement. AI based code builder 416 may use a k-means algorithm for weaving the code.

At 418, an AI based test builder may select one or more test scenarios from containers 414 based on the functions and generate test results. It should be appreciated that, as shown at 420, multiple tests cases may be generated for each block of code, i.e. snippet of code.

Additionally, performance and loading of scenario test cases may be grouped to test the final source code, as shown at 422.

Test results and the functions generated may be transmitted to IoT device 424 for displaying in an AR display to the users.

At 412, a video format of the application changes following the implementation of the requirements may be available in the AR powered device for the users to approve or reject.

At 430, users may view the results and code and either approve or deny acceptance. Upon approval, code may be transmitted to the deployment tool 434 for deploying and being readily available within an application 436 for users and developers. Upon denial, code may be transmitted back to the AI analyzer to re-generate code for testing and approval.

Figure 5:
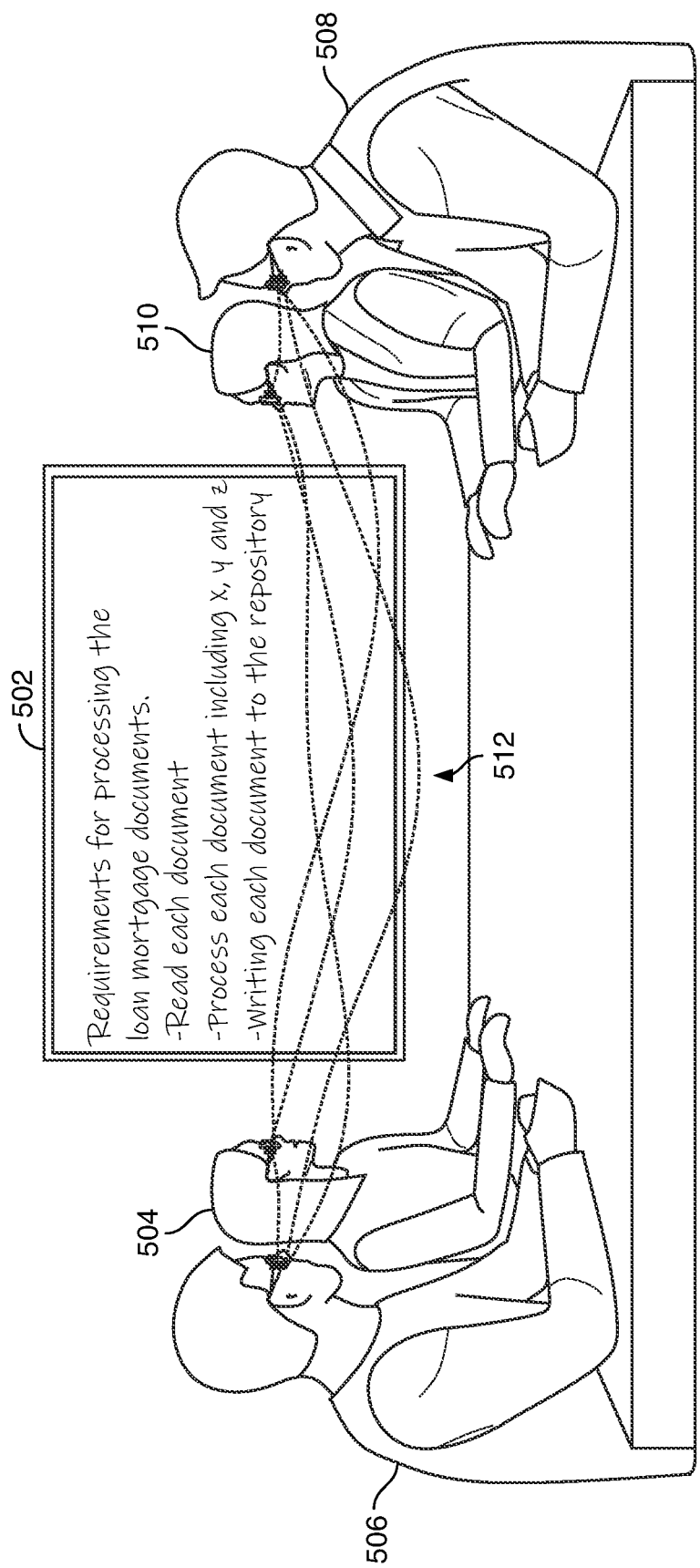
FIG. 5 shows an illustrative diagram in accordance with principles of the disclosure.

FIG. 5 shows an exemplary illustrative diagram for auto-code generation in real-time.

Users 504, 506, 508 and 510 may be a group of individuals that may be in a business meeting discussing solutions to meet business requirements associated with the entity that the individuals may be associated with.

Each of the users may be wearing smart glasses with AR capabilities embedded in the smart glasses. A proposed solution for the business requirement may be displayed on display 502. Display 502 may be one of a whiteboard, meeting room board, screen, physical document or any similar and/or suitable board.

In this exemplary diagram, display 502 may be a smart board. Display 502 may display numerous displays consecutively. The data displayed on display 502 may be constantly changing.

The data displayed may be different documents retrieved from the central server. The data displayed may be requirements proposed by each of users 504-510. The data displayed may also include the documents that the users may be discussing for a best solution for processing of the documents. When discussing a best solution for processing of the documents, the documents may be displayed repeatedly during the meeting.

The best solution may include a set of steps required to process the documents. The set of steps may be captured, converted into executable programming code, tested, approved and deployed, in real-time, while the users may be in the business meeting.

Each of the smart glasses worn by users 504-510 may be in electronic communication with a central server. Each of the smart glasses worn by users 504-510 may be in electronic communication with each other.

Smart glasses of user 506 may be the primary glasses for scanning and generating code.

In some embodiments the smart glasses may be configured to continuously capture the data displayed on the screen.

In some embodiments, each time a new set of data is displayed, smart glasses may be triggered to capture an image of the data. A new set of data may be detected by a pre-determined threshold change in data displayed on the screen.

Each image may be stored within the smart glasses. The smart glasses may be configured to detect an image that may include data associated with a set of processing steps which may indicate a business requirement that may need code generated to meet the needs of the business requirement.

In some embodiments, the smart glasses may be triggered to detect the image. One or more users may perform a gesture that may trigger the smart glasses to capture the data displayed.

In some embodiments, the smart glasses may be operable to detect the image using text and image recognition.

The data displayed in this exemplary diagram may include steps for solving a business requirement. The steps may be displayed by one or more of users 504-510. The steps may be displayed via input on a keyboard that may be connected to the display. The steps may be hand-written on the display by one or more users 504-510. In this illustrative diagram, the requirements may be hand-written as shown on display 502.

The steps described on the board may be captured as an image, converted into a text file, parsed into a plurality of steps for generating code and then further displayed to the users for approval prior to deploying. All this may be performed in real-time during the business meeting. The AR device(s) may be enabled to perform all the aforementioned steps and an IoT device in communication with the AR device(s) may enable displaying the results in an AR display of the AR device(s).

Thus, systems and methods for auto-code generation in real-time leveraging AR capabilities is provided. Persons skilled in the art will appreciate that the present invention can be practiced by other than the described embodiments, which are presented for purposes of illustration rather than of limitation.

What is claimed is:

1. An augmented reality ("AR") device for auto-generating executable programming code, the AR device being part of a network of AR devices, the AR device comprising:
   a camera operable to continuously capture an image of data displayed within pre-determined boundaries of a display;
   a microprocessor operable to:
      receive each captured image from the camera and store each captured image at the AR device;
      analyze each captured image in order to identify a captured image comprising a plurality of text associated with computer processing steps for processing a set of documents;
      in response to an identification of the captured image, transmit an electronic communication to the network of AR devices for retrieval of a most-repeated image captured by each of a remaining AR devices within the network of AR devices; and
      simultaneous to a transmittal of the electronic communication, identify a most-repeated image from the AR device by:
         retrieving each captured image stored at the AR device that has been historically received within a pre-determined time period prior to a receipt of the captured image;
         analyzing each captured image received prior to the captured image for a most-repeated image;
         in response to the analyzing, identifying the most-repeated image, wherein the most-repeated image comprises the set of documents for processing;
         comparing the most-repeated image from the AR device to the most-repeated image retrieved from each of the remaining AR devices; and
         when at least one of a most repeated images retrieved comprises the set of documents, determining a classifier for the set of documents, the classifier defining a document-type for the set of documents;
   an artificial intelligence ("AI") image processing neural network application configured to convert the captured image into a text file;
   an AI analyzer application configured to identify within the text file a set of computer processing steps; and
   an AI code generator application configured to generate code to perform the computer processing steps, the AI code generator configured to:
      search a production repository for a pre-generated function that performs the set of computer processing steps based on the classifier;
      when the pre-generated function in the production repository is identified, transmit the pre-generated function to an AI code builder for compiling; and
      when the pre-generated function in the production repository is not identified:
         search a plurality of code containers to find an optimal function for each step in the set of computer processing steps; and
         in response to a selection of the optimal function for each step, transmit the optimal function for each step to an AI code builder for compiling.

2. The AR device of claim 1, further comprising:
   the AI code builder application configured to, upon receipt of the pre-generated function:
      compile the pre-generated function into a single executable programming code; and
      transmit the single executable programming code to an AI code builder; and
   the AI code builder application configured to, upon receipt of the optimal function:
      receive the optimal function for each step;
      compile the optimal function for each step into a single executable programming code; and
      transmit the single executable programming code to an AI based test builder application.

3. The AR device of claim 2, further comprising:
   the AI based test builder application configured to test the single executable programming code and output test results;
   the microprocessor configured to transmit the test results to an IoT device to convert the test results into an AR readable format for being displayed on an AR display;
   the AR display configured to display the converted test results; and
   the microprocessor further configured to, in response to a trigger of an approval of the converted test results, feed the single executable programming code to a central server for deployment.

4. The AR device of claim 3, wherein following the approval of the test results, the microprocessor is further configured to store the single executable programming code in the production repository.

5. The AR device of claim 1, wherein the code containers comprise a Java container, a .Net container, a Python container and the production repository.

6. The AR device of claim 1, wherein the code containers are stored in a cloud server.

7. The AR device of claim 3, wherein the converted test results are in a form of a video displayed in the AR display for visualizing an execution of the single executable programming code.

8. The AR device of claim 1, wherein each AR device from the network of AR devices is a wearable device on a user.

9. The AR device of claim 3, wherein the trigger of the approval is a gesture from a user.

10. The AR device of claim 9, wherein in response to a trigger of a rejection of the converted test results, the microprocessor is configured to transmit a request to the AI code builder to generate a different single executable programming code.

11. The AR device of claim 1, wherein the AR device is a smart glasses comprising AR capabilities.

12. The AR device of claim 1, wherein following the feeding of the single executable programming code to the central server for deployment, the single executable programming code is available in real-time for processing the set of documents.

13. The AR device of claim 1, wherein the computer processing steps is a set of steps for a mode of processing the set of documents.

14. A method for generating and deploying executable programming code, in real-time, leveraging an augmented reality ("AR") device, the method performed by the AR device, the method comprising:
capturing, continuously, images of data displayed within pre-determined boundaries of a display screen;
storing each captured image at the AR device;
analyzing each captured image in order to identify a captured image comprising a plurality of text associated with computer processing steps for processing a set of documents;
in response to an identification of the captured image, identifying a most-repeated image from the AR device by:
retrieving each captured image stored at the AR device that has been historically received within a pre-determined time period prior to a receipt of the captured image;
analyzing each captured image received prior to the captured image for a most-repeated image; and
in response to the analyzing, identifying the most-repeated image, wherein the most-repeated image comprises the set of documents for processing;
determining a classifier for the set of documents, the classifier defining a type of document;
converting the captured image into a text file;
identifying within the text file, a set of computer processing steps;
searching a plurality of code containers to find an optimal function for each step in the set of computer processing steps;
in response to a selection of the optimal function for each step, compiling the optimal function for each step into a single executable programming code;
testing the single executable programming code;
outputting test results; and
transmitting the test results and the single executable programming code to an internet of things ("IoT") device for being operable for displaying on an AR display.

15. The method of claim 14, further comprising:
previewing, on the AR display, the test results and the single executable programming code executed against a plurality of test scenarios;
receiving approval via a user of the AR device of the previewing; and
in response to receiving approval, transmitting the single executable programming code to a central server for deploying.

16. The method of claim 15, wherein the previewing is in a form of a video type file.

17. The method of claim 14, further comprising, in response to a receipt of approval, storing the single executable programming code in a production repository as a pre-generated executable programming code for re-using.

18. The method of claim 15, wherein following the transmitting of the single executable programming code to the central server for deploying, executing the single executable programming code in real-time for processing the set of documents.

19. A method for generating and deploying executable programming code, in real-time, leveraging an augmented reality ("AR") device, the method performed by the AR device, the AR device being a part of a network of AR devices, the method comprising:
detecting a trigger by a user of the AR device for capturing data;
in response to the trigger, capturing an image of data that is within visual view of the AR device;
storing the captured image at the AR device;
converting the captured image into a text file;
identifying a set of computer processing steps included within the text file;
confirming the set of computer processing steps for accuracy by:
transmitting the text file to a second AR device within the network of AR devices for identifying, via the second AR device, a second set of computer processing steps included within the second text file;
receiving from the second AR device, the second set of computer processing steps identified within the second text file;
comparing the first set of computer processing steps to the second set of computer processing steps; and
in response to the comparing, confirming an accuracy of the set of computer processing steps;
searching a plurality of code containers to find an optimal function for each step in the set of computer processing steps; and
in response to a selection of the optimal function for each step, compiling the optimal function for each step into a single executable programming code;
testing the single executable programming code;
outputting test results; and
transmitting the test results and the single executable programming code to an internet of things ("IoT") device for being operable for displaying on an AR display.

20. The method of claim 19, wherein the AR device is a smart glasses comprising AR capabilities.

\* \* \* \* \*